Feb. 24, 1953

R. B. OLNEY 2,629,654

METHOD AND APPARATUS FOR CONTACTING FLUIDS

Filed Nov. 9, 1946

Inventor: Richard B. Olney
By his Attorney:

Patented Feb. 24, 1953

2,629,654

UNITED STATES PATENT OFFICE 2,629,654

METHOD AND APPARATUS FOR CONTACTING FLUIDS

Richard B. Olney, Berkeley, Calif., assignor to Shell Development Company, San Francisco, Calif., a corporation of Delaware Application November 9, 1946, Serial No. 708,865

11 Claims. (Cl. 23—310)

The present invention relates to method and apparatus for intimately contacting at least partially immiscible fluid materials. More particularly, it pertains to the treatment of one liquid with another liquid, such as in a washing or in an extraction process. More specifically, the invention relates to method and apparatus for intimately contacting relatively immiscible liquids by counter flow of the liquids through a partially restricted contacting zone which is defined on two sides thereof by means for dispersing the liquids one into the other.

It has been proposed by Van Dijck, in U. S. Patent 2,011,186, to improve the contacting of relatively immiscible liquids in countercurrent processes by dispersing a heavier liquid downwardly through relatively small openings in a perforated plate and into an extended body of a continuous phase of a second and lighter liquid and/or effecting the reverse operation wherein the lighter liquid is dispersed into the heavier liquid, to attain more efficient contacting, such as in an extraction process.

The present invention is in the nature of an improvement of the referred-to Van Dijck method and apparatus. Improvements over the Van Dijck method and apparatus are also disclosed and claimed in the copending application of Maycock and Hartwig, Ser. No. 709,008, filed November 9, 1946.

It has been found that when the method and apparatus disclosed in U. S. 2,011,186 are employed in countercurrent contacting processes, such as the solvent refining of lubricating oils, and the like, in which processes there is a relative change in the volumes of the liquid being subjected to extraction and the extracting liquid (solvent) as a result of at least partial transfer of a component of one of the liquids to the other liquid, or as a result of other causes, the relative volumes of the two liquid phases maintained in a given relatively restricted zone, which zone is defined by the walls of the vessel and two consecutive perforated plates, gradually changes until the thickness of one of the bodies of liquid in said given zone and in contact with one of the perforated plates is reduced until it no longer serves as an effective continuous phase into which the other liquid may be dispersed from the other side of said perforated plate and attain a significant solute (component) transfer. When that state is reached, which may be attained after a relatively small number of cycles of the alternate dispersions has been carried out, each perforated plate becomes effective only as a single dispersion plate.

In addition to effective loss of a body of one of the liquids, A, into which the other liquid, B, can be dispersed, when using prior art methods and apparatus, the absence of a body of sufficient thickness or depth of one of the liquids, A, in contact with a perforated plate results in dispersion of both liquids through that plate during the part of the cycle when that one liquid, A, alone, should be dispersed therethrough. This recycle or return across the whole area of the perforated plate of one of the liquids, B, to a previous zone or body of the same liquid, B, from which it had previously been dispersed represents a loss in two ways. First, it reduces directly the net throughput of the liquid, B, undergoing the recycling. Secondly, since the volume of liquid dispersed per half-cycle is fixed, any recycle dispersion of one liquid, B, decreases the direct dispersion of the other liquid, A.

As already indicated, other factors than relative concentrations of a given substance which is at least partially soluble in both of the liquid phases cause similar changes in relative volumes of the two liquid phases in the restricted zones and, consequently, reduce the operation of a double dispersion process to an effectively single dispersion (dispersion in a single direction) operation. Thus, temperature changes and fluctuations in flow in the contactor may cause relative volume changes and consequently a displacement of the liquid-liquid interface from the optimum position.

It is an object, therefore, of the present invention to provide improved method and apparatus for intimately contacting two counter flowing bodies of at least partially immiscible fluids wherein they are alternately and effectively dispersed one into a continuous body of substantial thickness of the other. Another object is to provide such method and apparatus for contacting relatively immiscible liquids wherein separate bodies of substantial depth of both liquids are maintained during an extended sequence of alternately dispersing one of the liquids into a body of the other liquid. A further object is to provide apparatus for alternately dispersing two counterflowing relatively immiscible liquids, one into the other, simultaneously at two or more consecutive zones of restricted flow and means adapted to substantially automatically maintain a constant liquid-liquid interface level intermediate between the dispersion zones. These and other objects will be more fully understood from the detailed description below of the invention.

Now, in accordance with the present invention, improved method and apparatus are provided for intimately contacting two counter flowing bodies of two at least partially immiscible fluids having different specific gravities wherein a body of the lighter liquid is stratified on a body of the heavier liquid, the continuous phase horizontal motion of each liquid is restricted to restricted zones in the respective bodies of the liquids, the liquids are reciprocably and alternately vertically dispersed one into the other through a limited area of the boundary therebetween, and the dispersed liquid thus derived from a given restricted zone is transferred to an adjacent contiguous restricted zone of the same liquid.

Generally described, the method of the present invention for intimately contacting two counterflowing, at least partially immiscible fluids having different densities comprises the steps of establishing a series of contiguous, horizontally restricted bodies of the lighter fluid lying on a series of contiguous, horizontally restricted bodies of the heavier fluid, each of the bodies of the lighter fluid in general lying above portions of two adjacent bodies of the heavier fluid and each of the bodies of the heavier fluid lying below portions of two of the contiguous bodies of the lighter fluid, alternately dispersing the lighter and heavier fluids one into the other at fluid boundaries which intervene in the directions of their respective directions of flow, which intervening boundaries are those at which light fluid must move downward to continue its forward motion in the direction of its normal flow and heavy fluid must move upward to continue its forward motion in the direction of its normal counterflow, and which intervening boundaries alternate with fluid interfaces away from the direction of normal flow, and transferring the dispersed liquid thus derived from a given one of the bodies of a given one of the two fluids, to a next adjacent one of said bodies of the same given fluid.

More particularly, the method of the present invention comprises establishing a series of separated bodies of relatively immiscible liquids having different densities, a given body of one of the liquids being disposed above or below (depending on which is the lighter liquid) a first body of the other liquid and separated therefrom by a perforate member and also disposed above or below, respectively, a second body of the other liquid and separated therefrom only by a liquid-liquid interface, the first and second bodies of the other liquid being in adjacent and horizontally restricted zones, alternately vertically dispersing one of the liquids into the other through the perforate members, and transferring the dispersed liquid thus derived from a given body of a given liquid to an adjacent restricted zone of the same liquid.

The apparatus of the present invention which provides for intimately contacting two bodies of counterflowing, at least partially immiscible fluids, such as for an extraction process, comprises in combination a horizontal vessel, a plurality of perforated plate members disposed substantially horizontally and in sequence and longitudinally within said vessel, imperforate partition means and cooperating separately with the two ends of each perforated plate and alternately on opposite sides of a given plate with the inside of the wall of the vessel to provide a plurality of contiguous and separate compartments along the long axis of the vessel and substantially liquid-proof one from another except for the perforated plate members therebetween, a pair of feed lines communicating with the two ends of the vessel, respectively, a pair of outlet lines communicating with the two ends of the vessel, respectively, for the liquids to be contacted, and an oscillatory pressure-imparting means communicating with the two ends of the vessel, respectively.

Having set forth the nature and purpose of the present invention in a general manner, the invention will be more clearly understood from a detailed description thereof which will be given now with reference to the accompanying drawings in which like numerals are used to designate similar elements in the various figures, and wherein.

Figure 1:
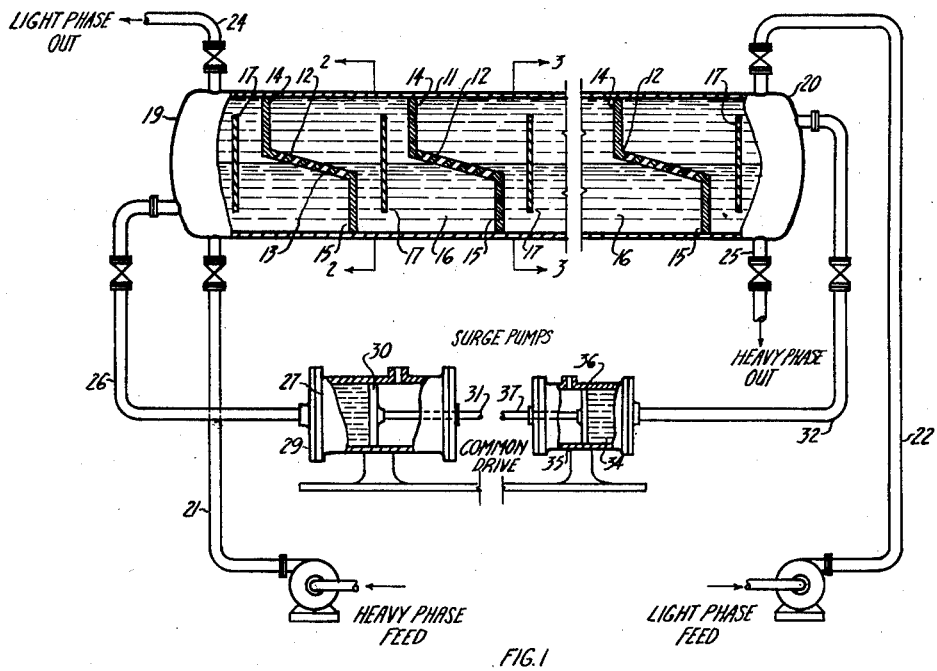
Fig. 1 is a front elevational view, partly cut away and part in cross-section, illustrating a preferred embodiment of the contactor of the invention and indicating the method for contacting liquids therewith in accordance with the invention.
Figure 2:
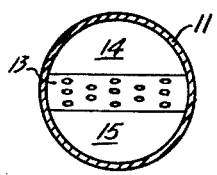
Fig. 2 is a section taken along the lines 2—2 of Fig. 1.
Figure 3:
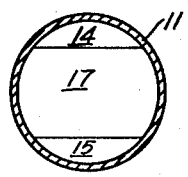
Fig. 3 is a section taken along the lines 3—3 of Fig. 1.

The apparatus shown in Fig. 1 is designed for intimately contacting a lighter liquid with a heavier one moving countercurrently through the vessel 11. The vessel 11 is provided on the inside thereof with a plurality of substantially horizontal or slightly inclined plates 12 having openings 13, the two ends of each one of which are provided on opposite sides thereof with partition plates or members 14 and 15, respectively, forming liquid-proof seals between the ends of the plates and the upper and lower peripheral halves of the inside wall of the vessel 11, thereby dividing the vessel into a plurality of contiguous and at least partially restricted compartments 16. Baffles 17 are generally found to be desirable to promote the segregation of the two phases in the compartments 16. The baffles 17 near the ends of the vessel form therewith end settling zones 19 and 20. The two end settling zones are provided with a pair of valved feed communicating lines 21 and 22, respectively, and with a pair of valved withdrawal or outlet communicating lines 24 and 25, respectively, for the fluids to be contacted. The end settling zone 19 communicates by means of a valved line 26 with the cylinder chamber 27 of a reciprocating pump 29 provided with a movable piston 30 which is provided with a piston rod or shaft 31 adapted to be driven by a suitable driving mechanism (not shown). The end settling zone 20 communicates by means of a valved line 32 with the cylinder chamber 34 of a reciprocating pump 35 provided with a movable piston 36 which is provided with a piston rod or shaft 37 adapted to be driven by a suitable driving mechanism. The piston rods or shafts 31 and 37 may be connected to the same or to separate driving mechanisms; in either case they are adapted to operate 180° out of phase with each other.

Figure 4:
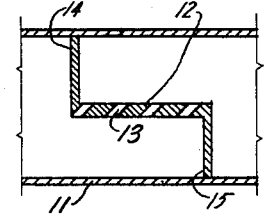
Fig. 4 is a cross-section of a portion of another embodiment of the contactor of the invention illustrating a modified design of the perforated plate.
Figure 5:
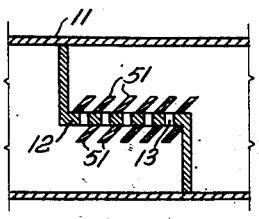
Fig. 5 is a cross-section of a portion of another embodiment of the contactor of the invention illustrating a still further modified design of the perforated plate.
Figure 6:
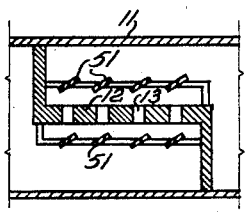
Fig. 6 is a cross-section of a perforated plate in accordance with the invention and in which members with angularly disposed surfaces cooperate with the perforations in the plate to effect the desired dispersion.
Figure 7:
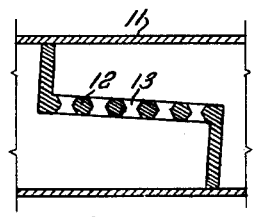
Fig. 7 is a cross-section of a still further modified perforated plate member to be used in accordance with the invention.

Figs. 4, 5, 6 and 7 illustrate other types of perforated partitions which may be used in lieu of those designated by the numeral 12 in Fig. 1. Fig. 4 illustrates a horizontal perforated plate 12 with the openings 13 therethrough inclined at an angle so that liquid forced therethrough will tend to be carried past the forward partitioning member (forward in the sense of the direction of flow of the liquid). In Fig. 5, the openings in the perforated plate are substantially vertical, but the plate is provided with inclined surfaces 51 which are adapted to cooperate with the respective openings to disperse and deflect streams of liquid forced through said openings. Fig. 6 illustrates a further modification of the perforated plate assembly shown in Fig. 5 wherein the inclined deflecting surfaces 51 are spaced from the perforated plate 12. Fig. 7 illustrates a perforated plate 12 in which the openings 13 therein are provided with restricted cross sections intermediate the extremities of said openings.

It will be understood that surge pump lines 26 and 32 may communicate in various ways with the end settling zones 19 and 20, respectively. Thus, they may be adapted to withdraw either one or both of the phases present in the settling zones, particularly, so long as they serve only to impart an oscillatory pressure directly on the ends of the body of liquids in the contactor. Also, it will be readily seen that surge pump 29 might communicate with settling zone 19 by means of heavy phase feed line 21; surge pump 35 might communicate with settling zone 20 by means of light phase feed line 22.

Instead of imparting an oscillatory pressure to the two ends of the body of liquids in the contactor by means of a surge pump, or surge pumps, it will be understood that the perforated plates with their coacting partitioning members 14 and 15 may be made movable in the vessel 11 and means may be provided for imparting a reciprocating oscillatory movement to the plates in the direction of the long axis of the vessel to alternately force the liquids therethrough in opposite directions.

The contactor vessel 11 may be provided with a jacket or jackets and thereby adapted to be operated at temperatures either below or above normal atmospheric temperature and/or the temperature of any one or all of the sections along the length of the vessel controlled as desired.

The operation of the apparatus will be understood more clearly from a description of the method of the invention described with reference to Fig. 1. Referring to Fig. 1, two at least partially immiscible liquids, such as a petroleum hydrocarbon fraction and a selective solvent for at least one of the components of the hydrocarbon fraction, the solvent being relatively heavier than the hydrocarbon fraction, are admitted to vessel 11 through valved lines 22 and 21, respectively, and caused to flow counter-currently throughout the entire length of the vessel until each of the contacting compartments 16, formed by the plates 12 and their coacting partition plates 14 and 15, contains substantially equal volumes of each of these liquids, and one side of each perforated plate is substantially contacted by a single one of the liquids. In each of these compartments the heavier liquid settles to the bottom, and the lighter liquid rises to the top, so that there is a body of substantial thickness of liquid phase consisting substantially only of the heavier liquid on the lower side of each perforated plate 12 and a body of substantial thickness of liquid phase consisting substantially only of the lighter liquid on the upper side of each plate 12.

The openings 13 in the perforated plates may be of various sizes depending on the properties of the liquids being contacted, the surge pressures which it is desired to apply, etc. Relatively large openings having diameters in the order of about one-eighth to one-fourth of an inch may be utilized with relatively high jet velocities of the liquids to be dispersed. However, since it is generally desired that the energy of the stream be sufficient to carry the material far enough horizontally to project beyond the end of the perforated plate, it is generally preferred to utilize relative smaller sized openings so that the surge pressure requirements are not unduly large. The openings may be complemented with suitable surfaces upon which the streams of liquid forced through the openings are allowed to impinge and thus aid in dispersion. The size and arrangement of openings for optimum effective dispersion and contacting will depend on relative viscosities, interfacial tensions, etc. of the fluids being contacted, the surge pressures, etc. As an illustration of suitable opening sizes, it has been found that openings of from about twenty-five to about seventy-five thousandths of an inch diameter give satisfactory results when contacting an aqueous solution of acetic acid with methyl isobutyl ketone.

After the contactor compartments are filled with the two counter-flowing liquids, the liquids are alternately dispersed, one into the other, by alternately forcing the liquids through the relatively small openings 13 in the perforated plates 12, by applying an oscillatory pressure to the liquid bodies contained in the settling zones 19 and 20. It will be noted that each of the horizontally restricted bodies of heavy liquid within the compartments 16 lies below two bodies of lighter liquid, and is separated therefrom by two boundaries: the first boundary, toward the end of the zone 20 and in the direction of normal flow of the heavy liquid, is at the perforated plate 12; the second boundary, toward the end zone 19 and in the direction opposite to the direction of normal flow of the heavy liquid, is a free liquid-liquid interface. Similarly, each super supernatant horizontally restricted body of light liquid is separated from two lower bodies of heavier liquid by two boundaries: the first boundary, toward the end zone 19 and in the direction of normal flow of the light liquid, is at the perforated plate 12; the second boundary, toward the end zone 20 and in a direction opposite to the direction of normal flow of the light liquid, is a free liquid-liquid interface. It is evident that the "first" boundaries, described with reference to the heavy liquid are the same as the "first" boundaries described with reference to the light bodies; similarly, the two series of "second" boundaries are the same. Dispersion of one liquid into the other occurs always at the "first" boundaries, while transfer of a dispersed to a body of like liquid occurs at the "second" boundaries, which alternate with the "first." Hence, in every case, dispersion is effected at the fluid boundaries of any body of liquid which intervene in the direction of normal flow of the same liquid.

Consider a single cycle of operation in detail, starting with the surge pump 35 filled with light phase and with its piston at left dead center (full). The valves in heavy phase exit line 25 and light phase feed line 22 are closed, preferably by cam operated mechanisms responsive to the driving mechanism for the surge pumps and coordinated with the operation of said pumps. The valves in heavy phase feed line 21 and light liquid exit line 24 are both open to vessel 11, and the piston in surge pump 29 is at left dead center (empty).

During the first half of the operational cycle a volume $F_H$ of heavy phase feed is delivered to settling zone 19 through line 21, a volume of $E_L$ of settled light phase is withdrawn from settling zone 19 through exit line 24, a volume L of light phase is delivered to the end settling zone 20 from surge pump 35 as the piston 36 advances to right dead center, thereby forcing a volume L of light phase downward and to the left through the first perforated plate 12 nearest the settling zone 20, and a volume H of heavy phase is withdrawn from end settling zone 19 into surge pump 29 as piston 30 therein retreats to right dead center.

Remembering, as stated above, that at the beginning of this operational half-cycle light phase covered all of the upper side of each perforated plate and that heavy phase covered all of the lower side of each perforated plate, which condition may be readily attained when the plates are not inclined appreciably from the horizontal, the volume L of light phase dispersed through the first perforated plate 12, which is nearest end zone 20, may be effected without simultaneous dispersion therewith of any of the volume of heavy phase in said zone 20. Now, with the dispersion of a volume L of light phase into the first compartment 16 from the right end of the contactor, there will be, in the case of a relatively heavier solvent extraction of a relatively lighter hydrocarbon fraction, a transfer of extractable component from the volume L of light phase to the body of heavy, solvent phase in said first compartment 16. This transfer of solute or component from light, hydrocarbon phase to heavy, solvent phase results in a decrease in the volume of the light phase delivered to said first compartment 16 and a related increase in the volume of the heavy phase in said compartment. Assuming that the absolute volume decrease of the light phase dispersed into said compartment is the same as the absolute volume increase of the heavy phase therein, it is clear that the same volume L of liquid must be dispersed simultaneously to the left through the next perforated plate, since the volume of said first compartment 16 is constant. With the dispersion of a volume L of light phase through said next perforated plate, the relative volumes of light and heavy phases in said first compartment will be changed so that the liquid-liquid interface level rises. With sufficient rise in the interface level, the light phase will no longer completely cover the upper side of the second perforated plate from the right end of the contactor. Similar considerations apply for the succeeding perforated plates and contacting compartments. The consequence of the change in relative volumes of the two liquids in a given compartment will be considered at greater length after a description of the next half-cycle of operation.

During the second half of the operational cycle the valves in lines 21 and 24 are closed, the valves in lines 22 and 25 are open, a volume $F_L$ of light phase feed is delivered to end settling zone 20 through line 22, a volume $E_H$ of settled heavy phase is withdrawn from settling zone 20 through line 25, a volume H of heavy phase is delivered to the end settling zone 19 through line 26 from surge pump 29 as the piston 30 therein advances to left dead center, thereby forcing a volume H of heavy phase upward and to the right through the perforated plate 12 nearest end zone 19, and a volume L of light phase is withdrawn from end zone 20 into surge pump 35 as piston 36 therein retreats to left dead center. During this operational half-cycle, a volume H of liquid is forced upward and to the right through each perforated plate. But, the dispersion of heavy phase through, say, the first perforated plate in the direction of flow of heavy phase and into the first contacting compartment results in a relative volume increase of the heavier liquid phase in said compartment and a relative volume decrease of the lighter liquid phase. This relative volume change results in a relative rise in the liquid-liquid interface level in the compartment. Thus, it is seen that operation of both half-cycles tends to cause the liquid-liquid interface level to rise.

After a number of cycles of operation the liquid-liquid interface level will become changed so that, in this case, the upper side of the perforated plates will no longer be covered solely by light phase material; instead, some of the openings will be covered by heavy phase. When this condition has been reached, the surge which causes dispersion of the light phase through a given plate in the general direction of flow of the light phase through the contactor, also will force a small volume of heavy phase through said given plate in the same direction, which direction is reverse to the general direction of flow of the heavy phase through the contactor. Thus a portion of heavy phase is recycled to a preceding compartment from which it had already been dispersed. This recycle compensates, at least in part, for the relative change in interface level caused by the relative changes in volumes of the light and heavy phases. Corresponding compensation occurs when the component transfer is from the heavier to the lighter phase.

When the perforated plates 12 are horizontal as shown in Fig. 4, a rise of the liquid-liquid interface level above the level of the upper side of the plate results in a relatively thin layer of heavy phase interposed between the upper side of the plate and the body of light phase. Now when heavy phase from the body of heavy phase below the plate is forced through the openings, the streams of heavy phase may pass through the thin layer of heavy phase lying on the upper side of the perforated plate and into the body of light phase with effective dispersion and contacting, so long as said intervening thin layer of heavy phase is not of sufficient thickness to absorb the energy of the jets and prevent penetration to the phase of the other liquid. Thus, effective dispersion and contacting in the direction of heavy phase into light phase may not be materially affected. However, on the reverse half-cycle wherein it is desired to disperse light phase into heavy phase, the heavy phase making up the thin layer of heavy phase immediately adjacent the perforated plate is forced through the perforated plate into the body of heavy phase lying below the plate and either simultaneously therewith or subsequently light phase is forced through the perforated plate until the total volume required to be transferred through the perforated plate has been thus transferred. In general, this recycle of one phase does not exceed more than about fifty percent of the volume to be dispersed, and, usually it is not more than about ten to twenty-five percent. Although the recycle represents an increased energy requirement for the process, this increase in energy requirement is more than compensated for by the increased efficiency of the process over what the efficiency would eventually degenerate to without the recycle, namely, effectively an operation in which there was effective dispersion in only one direction instead of the effective dual or double dispersion contacting of the present invention.

Thus, by employing the method and apparatus of this invention the indicated countercurrent intimate contacting may be effected while maintaining the conditions in the apparatus substantially uniform and assuring alternate dispersion of one of the liquids into a body of substantial depth of the other one of the liquids.

While the method and apparatus of this invention have been described with reference to a preferred embodiment thereof, it will be understood that various modifications coming within the scope of the invention may be utilized, and the invention is not to be limited to the specific form or arrangement of parts described and shown, but is coextensive in scope with the claims.

I claim as my invention:

1. A method for intimately contacting two counter flowing, at least partially immiscible fluids having different densities which comprises establishing a series of contiguous, horizontally restricted bodies of the lighter fluid lying on a series of contiguous, horizontally restricted bodies of the heavier fluid, at least one of said bodies of the lighter fluid lying above portions of two adjacent bodies of the heavier fluid and at least one of said bodies of the heavier fluid lying below portions of two adjacent bodies of the lighter fluid, there being a perforated member between each restricted body of heavier fluid and the supernatant body of lighter fluid in the direction of flow of heavier fluid and a liquid-liquid interface between each restricted body of heavier fluid and another body of lighter fluid in the opposite direction; and alternately dispersing the lighter fluid into the heavier fluid through said perforated members and dispersing the heavier fluid into the lighter fluid through each of said perforated members.

2. A method for intimately contacting two counter flowing, at least partially immiscible liquids having different densities which comprises the steps of establishing a series of contiguous, horizontally restricted bodies of the lighter liquid lying on a series of contiguous, horizontally restricted bodies of the heavier liquid, at least one of said bodies of the lighter liquid lying above portions of two said contiguous bodies of the heavier liquid and at least one of said bodies of the heavier liquid lying below portions of two of said contiguous bodies of the lighter liquid, there being a perforated member between each restricted body of heavier fluid and the supernatant body of lighter fluid in the direction of flow of heavier fluid and a liquid-liquid interface between each restricted body of heavier fluid and another body of lighter fluid in the opposite direction; alternately dispersing the lighter fluid into the heavier fluid through said perforated members and dispersing the heavier fluid into the lighter fluid through each of said perforated members; transferring the lighter liquid thus dispersed from each body of heavier liquid through each respective liquid-liquid interface to a body of lighter liquid contiguous to the body of lighter liquid from which the transferred liquid was derived, and in the direction of normal flow of the lighter liquid; and transferring the heavier liquid thus dispersed from each body of lighter liquid through the respective liquid-liquid interface to a body of heavier liquid contiguous to the body of heavier liquid from which the transferred liquid was derived and in the direction of normal flow of the heavier liquid.

3. An apparatus for intimately contacting two at least partially immiscible liquids having different relative densities, which comprises in combination, a substantially horizontal vessel, a plurality of perforated plate members disposed substantially horizontally and in sequence and longitudinally within said vessel and imperforate partition means cooperating separately with the two ends of each perforated plate and alternately on opposite sides of a given plate with the inside of the wall of the vessel to provide a plurality of contiguous and separate compartments along the long axis of said vessel, said compartments being substantially liquid-proof one from another except for the perforated plate members therebetween, a pair of feed lines for the liquids to be contacted communicating respectively with the two ends of the vessel, a pair of outlet lines for the contacted liquids communicating respectively with the two ends of the vessel, and an oscillatory pressure-imparting means communicating with the two ends of the vessel, respectively.

4. An apparatus for intimately contacting two at least partially immiscible liquids having different relative densities, which comprises in combination, a substantially horizontal vessel, a plurality of perforated plate assemblies disposed in said vessel and dividing the vessel into a plurality of contiguous contacting compartments, said plate assemblies comprising substantially horizontal perforated plate members disposed longitudinally within said vessel and imperforate partition members cooperating with the ends of the plates and the inner periphery of the wall of the vessel alternately on opposite sides of the perforated plate members to form liquid-proof seals between the plate assemblies and the vessel except for the perforated plate member, a pair of feed lines for the liquids to be contacted communicating respectively with the two ends of the vessel, and a pair of outlet lines for the contacted liquids communicating respectively with the two ends of the vessel, for the liquids to be contacted, and reciprocating means communicating with said vessel near the two ends thereof and adapted to impart oscillatory pressure to liquid in the vessel.

5. An apparatus for intimately contacting two relatively immiscible liquids having different relative densities, which comprises in combination, a substantially horizontal vessel, a plurality of perforated plate assemblies disposed in said vessel and adapted to divide the vessel into a plurality of contiguous contacting compartments and into two end settling compartments, said plate assemblies comprising perforated plates disposed substantially horizontally and longitudinally within said vessel and means coacting therewith to form substantially transverse liquid-proof seals with the inside of the wall of the vessel, a pair of feed lines for the liquids to be contacted communicating respectively with the two end compartments, and a pair of outlet lines for the contacted liquids communicating respectively with the two end compartments, for the liquids to be contacted, and reciprocating pump means communicating with said two end settling compartments, respectively, and adapted to impart oscillatory pressure to liquid in the vessel.

6. A method for contacting liquids which comprises establishing a series of separated bodies of first and second at least partially immiscible liquids having different densities, wherein a continuous body of said first liquid is disposed vertically from a first continuous body of said second liquid and is separated therefrom substantially only by a perforate member, and a second continuous body of said second liquid is disposed vertically from said body of first liquid and is separated therefrom substantially only by a liquid-liquid interface, the first and second bodies of said second liquid being in separate, horizontally adjacent and horizontally restricted zones and the body of liquid having a relatively lower density being above the body of relatively lower density, alternately dispersing the liquid of lower density downwards through said perforate member into the subjacent continuous body of the liquid of greater density and dispersing the liquid of greater density upwards through said perforate member into the superjacent continuous body of the liquid of lower density, and transferring the dispersed liquid thus derived from a given body of a given one of the liquids by passage through the continuous body of the other liquid to a restricted zone that contains the same given liquid and is horizontally adjacent to said given body.

7. A method for contacting at least partially immiscible, relatively lighter and heavier liquids, which method comprises establishing a series of separated bodies of said liquids wherein a continuous body of the lighter liquid is disposed on a first continuous body of the heavier liquid and is separated therefrom substantially only by a perforated partition, and a second continuous body of the heavier liquid is disposed below said body of lighter liquid and is separated therefrom substantially only by a liquid-liquid interface, the first and second bodies of heavier liquid being in separate, adjacent and horizontally restricted zones, alternately dispersing the lighter liquid from said body thereof downwards through the perforated partition into the continuous first body of heavier liquid and dispersing the heavier liquid from said first body thereof upwards through the perforated partition into said continuous body of lighter liquid, and transferring the dispersed heavier liquid, which was derived from said first body thereof, by passage through the continuous body of lighter liquid and through said liquid-liquid interface to said second body of heavier liquid.

8. A method for contacting at least partially immiscible, relatively lighter and heavier liquids, which method comprises establishing a series of separated bodies of said liquids wherein a continuous body of the heavier liquid is disposed beneath a first continuous body of the lighter liquid and is separated therefrom substantially only by a perforated partition, and a second continuous body of the lighter liquid is disposed on said body of heavier liquid and is separated therefrom substantially only by a liquid-liquid interface, the first and second bodies of lighter liquid being in separate, adjacent and horizontally restricted zones, alternately dispersing the lighter liquid from said first body thereof downwards through the perforated partition into the said continuous body of heavier liquid and dispersing the heavier liquid from said continuous body thereof upwards through the perforated partition into said first continuous body of lighter liquid, and transferring the dispersed lighter liquid, which was derived from said first body thereof, by passage through the continuous body of heavier liquid and through said liquid-liquid interface to said second body of lighter liquid.

9. An apparatus for intimately contacting two at least partially immiscible liquids having different densities, which comprises, in combination: a substantially horizontal vessel; a plurality of partition members disposed side by side within and along the length of the vessel, each partition member having an intermediate part with restricted liquid flow openings therein, said part extending longitudinally within the vessel and substantially horizontally at a level between the top and bottom thereof, and further having wall means connecting longitudinal ends of the intermediate part alternately to the top and bottom of the vessel, thereby dividing the vessel into a plurality of horizontally contiguous contacting compartments and two end settling compartments, a part of each compartment having a part thereof that is above the intermediate part of the partition member overlying a part of an adjoining compartment; a pair of feed lines for the liquids to be contacted communicating respectively with the two end compartments; a pair of outlet lines for the contacted liquids communicating respectively with the two end compartments; and means for causing flow of liquids within the vessel alternately in opposite directions by passage through the openings in the successive partition members.

10. An apparatus for intimately contacting two at least partially immiscible liquids having different densities, which comprises, in combination: a substantially horizontal vessel; a plurality of perforated plate assemblies disposed side by side within and along the length of the vessel and connected to the walls of said vessel so as to divide the vessel into a plurality of horizontally contiguous contacting compartments, said plate assemblies comprising perforated plates disposed substantially horizontally and longitudinally within said vessel and spaced vertically from the top and bottom thereof; a pair of feed lines for the liquids to be contacted communicating respectively with the two end compartments; a pair of outlet lines for the contacted liquids communicating respectively with the two end compartments; and oscillatory pressure-imparting means communicating with the two ends of the vessel for causing flow of liquids alternately in opposite directions by passage through the perforated plates.

11. An apparatus for intimately contacting two at least partially immiscible liquids having different densities, which comprises, in combination: a substantially horizontal vessel; a plurality of perforated plate assemblies disposed side by side within and along the length of the vessel and connected to the walls of said vessel so as to divide the vessel into a plurality of horizontally contiguous contacting compartments, said plate assemblies comprising perforated plate members disposed substantially horizontally and longitudinally within said vessel and spaced vertically from the top and bottom thereof, each perforated plate member lying between vertically overlapping portions of adjacent compartments; a pair of feed lines for the liquids to be contacted communicating respectively with the two end compartments; a pair of outlet lines for the contacted liquids communicating respectively with the two end compartments; and surge pump means communicating with said vessel near the two ends thereof and adapted to withdraw liquid alternately from the respective ends thereof and to return withdrawn liquid alternately to the respective ends to cause flow of liquid within the vessel alternately in opposite directions by passage through the perforated plates.

RICHARD B. OLNEY.

REFERENCES CITED

The following references are of record in the file of this patent:

UNITED STATES PATENTS

| Number | Name | Date |
| --- | --- | --- |
| Re. 21,725 | Harrington | Feb. 25, 1941 |
| 2,011,186 | Van Dijck | Aug. 13, 1935 |
| 2,361,780 | Lewis | Oct. 31, 1944 |
| 2,364,892 | Elgin | Dec. 12, 1944 |

FOREIGN PATENTS

| Number | Country | Date |
| --- | --- | --- |
| 452,302 | Great Britain | Aug. 20, 1936 |